(No Model.)
H. A. BURT.
VEHICLE POLE.
No. 420,434. Patented Feb. 4, 1890.
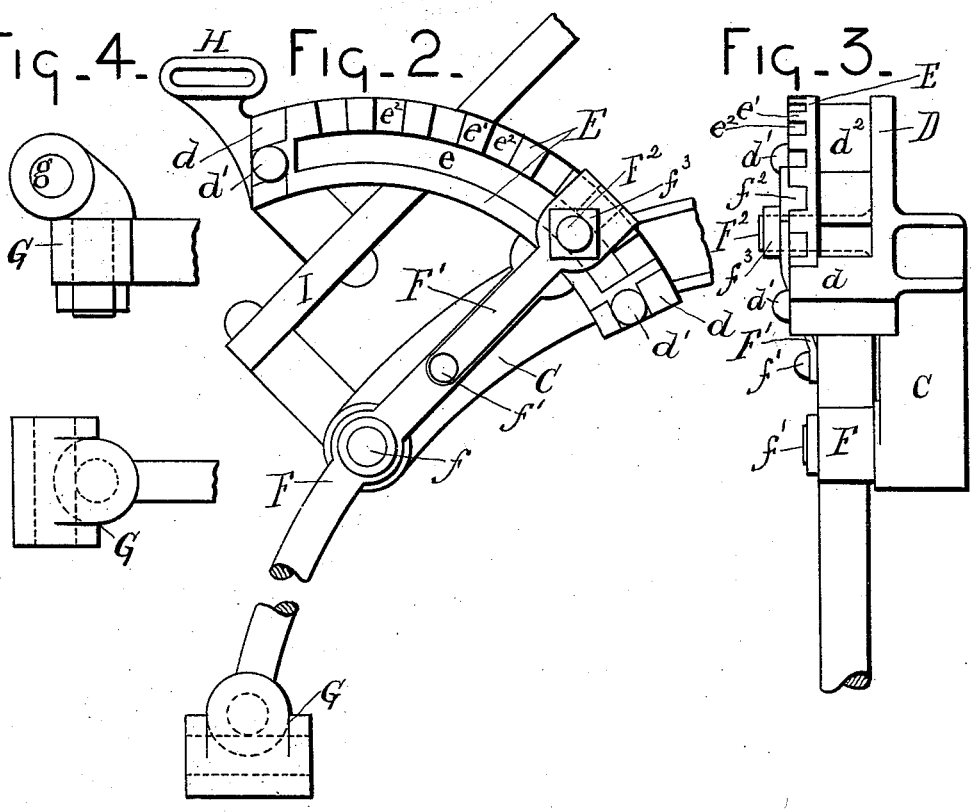

UNITED STATES PATENT OFFICE.

HOMER A. BURT, OF DETROIT, MICHIGAN.

VEHICLE-POLE.

SPECIFICATION forming part of Letters Patent No. 420,434, dated February 4, 1890.

Application filed July 13, 1889. Serial No. 317,404. (No model.)

*To all whom it may concern:*

Be it known that I, HOMER A. BURT, a citizen of the United States, residing at Detroit, county of Wayne, State of Michigan, have invented a certain new and useful Improvement in Vehicle-Poles; and I declare the following to be a full, clear, and exact description of the same, such as will enable others skilled in the art to which it pertains to make and use the same, reference being had to the accompanying drawings, which form a part of this specification.

My invention has for its object the production of a vehicle-pole which shall be readily adjustable to a vehicle of any ordinary gage.

In the drawings, Figure 1 is an inverted plan view of a vehicle-pole embodying my invention. Fig. 2 is an enlarged view of the under side of the adjusting mechanism. Fig. 3 is a side elevation of the mechanism shown in Fig. 2. Fig. 4 shows detail views of the means of attaching the pole to the vehicle.

In carrying out my invention, A represents the pole, and B the usual curved cross-bar. Attached to the ends of this curved cross-bar is the adjusting mechanism. This consists of a main portion C, preferably made of malleable iron and having its edges $c$ turned over to embrace and clamp the end of the curved cross-bar. Suitable bolts may be passed through the metal and bar to hold them firmly together. Preferably cast integral with this main portion C is the curved piece D, extending at substantially right angles from the portion C, and having on its ends the lugs $d$. Attached to these lugs by the screws $d'$ is the piece E, having the slot $e$ through its longitudinal center. The portion $e'$ of this cross-piece E is provided with the notches $e^2$. F is a lever, pivoted at $f$ to the main portion C and having its long arm extending back for engagement with the vehicle, where it is provided with the swivel G, having the eye $g$ for engagement with the ordinary clip on the axle. The short arm of the lever F extends forward and enters the space $d^2$, between the curved pieces D E. Attached to the under side of this short arm by the bolt $f'$ is the spring F', provided on its end with projections $f^2$, corresponding with the notches $e^2$. This spring is so bent that it will come below the curved piece E and allow the projections $f^2$ to engage with the notches $e^2$. It can be held firmly in this engagement by the bolt $F^2$, which is passed through the lever, through the slot $e$, and through the end of the spring, where it is tightened by the nut $f^3$.

It will be readily seen that by loosening the nut $f^3$ and moving the short arm of the lever the long arm can be adjusted to any desired position, and then by tightening the nut the notches on the spring engage with the notches on the curved piece E, and the lever is held firmly in place.

H is an eye to receive a strap for connection with the doubletree, and I are brace-rods extending from the adjusting mechanism to the pole.

Of course the means for engaging the levers F in the desired position might be varied without departing from the spirit of my invention, which consists, essentially, of adjustable levers pivoted to the ends of the curved cross-bar and adapted for engagement with the vehicle.

What I claim is—

1. An adjustable vehicle-pole consisting of the combination, with the pole and its curved cross-bar, of levers pivoted to the cross-bar and adapted to be fastened to the vehicle, said levers being provided with springs adapted to engage with notches in curved pieces or segments on the cross-bar for holding the levers in any desired position, substantially as described.

2. In the herein-described adjustable vehicle-pole, the combination, with the pivoted levers F, of swivel-bolts located on the end of the said lever and provided with an eye to receive the bolt which engages it to the vehicle, substantially as described.

In testimony whereof I sign this specification in the presence of two witnesses.

HOMER A. BURT.

Witnesses:
W. H. CHAMBERLIN,
L. A. DOELTZ.